(12) United States Patent
Kim

(10) Patent No.: US 11,548,409 B2
(45) Date of Patent: Jan. 10, 2023

(54) COOLING ASSEMBLY FOR HYDROGEN ELECTRIC TRUCKS

(71) Applicants: Hyundai Motor Company, Seoul (KR); Kia Corporation, Seoul (KR)

(72) Inventor: Jong Min Kim, Hwaseong-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/385,024

(22) Filed: Jul. 26, 2021

(65) Prior Publication Data

US 2022/0194263 A1 Jun. 23, 2022

(30) Foreign Application Priority Data

Dec. 21, 2020 (KR) .......................... 10-2020-0179156

(51) Int. Cl.
*B60L 58/33* (2019.01)
*B60K 11/06* (2006.01)

(52) U.S. Cl.
CPC .............. *B60L 58/33* (2019.02); *B60K 11/06* (2013.01)

(58) Field of Classification Search
CPC .......... B60L 58/33; B60L 58/32; B60L 58/30; B60K 11/06
See application file for complete search history.

(56) References Cited

U.S. PATENT DOCUMENTS

2021/0155224 A1* 5/2021 McKibben .............. B60L 58/40

FOREIGN PATENT DOCUMENTS

| CN | 208515375 U | 2/2019 |
|---|---|---|
| KR | 10-1353413 B | 1/2014 |
| KR | 10-1655577 B | 9/2016 |
| KR | 10-2026103 B | 9/2019 |

* cited by examiner

*Primary Examiner* — Jacob M Amick
(74) *Attorney, Agent, or Firm* — Morgan, Lewis & Bockius LLP

(57) ABSTRACT

A cooling assembly for hydrogen electric trucks may include a stack cooling unit configured to cool a fuel cell, and at least one electric part cooling unit located on a side surface of a hydrogen electric truck, wherein a surface of the stack cooling unit configured to face an external surface of the hydrogen electric truck and a surface of the electric part cooling unit configured to face the external surface of the hydrogen electric truck are configured independently of each other.

13 Claims, 3 Drawing Sheets

COOLING ASSEMBLY FOR HYDROGEN ELECTRIC TRUCKS

CROSS-REFERENCE TO RELATED APPLICATION

The present application claims priority to Korean Patent Application No. 10-2020-0179156 filed on Dec. 21, 2020, the entire contents of which is incorporated herein for all purposes by this reference.

BACKGROUND OF THE INVENTION

Field of the Invention

The present invention relates to a cooling assembly for hydrogen electric trucks. More particularly, it relates to a cooling assembly for hydrogen electric trucks in which a stack cooling unit and an electric part cooling unit are disposed separately and cross members configured to increase rigidity in the forward and rearward directions are applied.

Description of Related Art

In an internal combustion engine vehicle using fossil fuel, a large amount of heat is generated by an engine during a process of igniting and combusting high-temperature and high-pressure gas, and thus, if cooling is not performed, various parts including cylinders and pistons melt or burn due to overheating and are thus damaged. Therefore, a jacket configured to contain cooling water is provided around the cylinder, cooling water is circulated inside the jacket to absorb heat generated by the engine, and thereby the engine is cooled. However, when the cooling water absorbs heat from the engine for a long time and thus reaches a high temperature, the cooling water cannot absorb any more heat from the engine, and thus, an apparatus of cooling the cooling water is required. A radiator, which is an apparatus of cooling such high-temperature cooling water through circulation, serves to emit a portion of heat generated in an internal combustion engine to the atmosphere via cooling water. In general, radiators mostly have the form of a widely used heat exchanger, which include tubes arranged in a plurality of rows, a pair of header tanks coupled to respective both ends of the tubes, and pins located between the tubes.

Also, in an electric vehicle which utilizes a fuel cell as a power source, heat is generated by various electric parts, such as a fuel cell stack, a motor, an inverter, etc. Therefore, in a manner similar to the above system for cooling the internal combustion engine using cooling water, cooling is performed by absorbing heat generated by the electric parts using cooling water. Furthermore, in a manner similar to the above system for cooling the internal combustion engine, the cooling water, the temperature of which is raised due to the absorbed heat, is cooled by a separate radiator.

Trucks are vehicles that are used to transport freight or heavy goods. Trucks having internal combustion engines cause global warming due to emission of exhaust gases, and additionally, trucks having diesel engines emit fine particulate matter. Therefore, hydrogen electric trucks using batteries and electric motors are being developed.

Hydrogen electric trucks have the following important characteristics. In a hydrogen electric truck, a large amount of heat is generated by a motor, a high-voltage battery, a fuel cell stack, and electric parts while driving. Because the hydrogen electric truck requires high output in consideration of loading of heavy freight for customers and severe driving conditions, the amount of heat generated by the hydrogen electric system of the hydrogen electric truck is rapidly increased. Furthermore, heat radiated from the road in the middle of summer and solar radiation must be considered. The hydrogen electric truck is not capable of driving when the heat generated by the hydrogen electric truck is not properly removed, and thus requires sufficient cooling performance.

Main cooling systems of hydrogen electric trucks include a stack radiator and an electric part radiator. In initially designed hydrogen electric trucks, both the stack radiator and the electric part radiator are mounted on the front portion of the hydrogen electric truck. However, if both the stack radiator and the electric part radiator are provided, the respective radiators block each other and thus have difficulty in realizing optimal cooling performance.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a cooling assembly for hydrogen electric trucks in which a stack cooling unit and an electric part cooling unit are disposed separately to improve cooling performance.

Various aspects of the present invention are directed to providing a cooling assembly for hydrogen electric trucks to which cross members configured to increase rigidity in the forward and rearward directions are applied to improve the rigidity of the body of the hydrogen electric truck.

Various aspects of the present invention are directed to providing a cooling assembly for hydrogen electric trucks, including a stack cooling unit configured to cool a fuel cell, and at least one electric part cooling unit located on a side surface of a hydrogen electric truck, wherein a surface of the stack cooling unit configured to face an external surface of the hydrogen electric truck and a surface of the at least one electric part cooling unit configured to face the external surface of the hydrogen electric truck are configured independently of each other.

In various exemplary embodiments of the present invention, each of the at least one electric part cooling unit may include at least one main bracket coupled to a side surface of a body of the hydrogen electric truck, at least one cross member mounted on the at least one main bracket, and an electric part radiator fixed to the at least one main bracket to cool an electric part of the hydrogen electric truck.

In another exemplary embodiment of the present invention, the at least one cross member may include a first cross member located on an upper surface of the at least one main bracket.

In yet another exemplary embodiment of the present invention, the at least one cross member may further include a second cross member located on a lower surface of the at least one main bracket.

In yet another exemplary embodiment of the present invention, the at least one cross member may further include a third cross member located between the first cross member and the second cross member in a height direction of the at least one main bracket.

In still yet another exemplary embodiment of the present invention, the electric part radiator may be located on an external end portion of the at least one main bracket and be configured to be coupled to the second cross member.

In a further exemplary embodiment of the present invention, the stack cooling unit may be located at a front portion of the hydrogen electric truck, and the stack cooling unit may include a stack radiator connected to a fuel cell stack to cool the fuel cell stack, and a stack connection channel to connect the fuel cell stack to the stack radiator so that heat generated by the fuel cell stack flows toward the stack radiator.

In another further exemplary embodiment of the present invention, the electric part radiator may be connected to the electric part, and each of the at least one electric part cooling unit may further include an electric part connection channel connecting the electric part to the electric part radiator so that heat generated by the electric part flows toward the electric part radiator.

In yet another further exemplary embodiment of the present invention, the electric part may include at least one of a low-voltage DC-DC converter (LDC), a high-voltage DC-DC converter (HDC), a fuel-cell DC-DC converter (FDC), a high-voltage junction box for automotive vehicles, a motor control unit (MCU), an electric heat pump (EHP) or a motor.

In yet another further exemplary embodiment of the present invention, the at least one electric part cooling unit may be coupled to one of both side frames of a body of the hydrogen electric truck by bolting.

In still yet another further exemplary embodiment of the present invention, the least one electric part cooling unit may be coupled to each of both side frames of a body of the hydrogen electric truck by bolting.

In a still further exemplary embodiment of the present invention, the cooling assembly for hydrogen electric trucks may further include an air compressor coupled to the third cross member to generate compressed air, and an air tank disposed below the air compressor, coupled to the third cross member, and configured to store the compressed air generated by the air compressor.

In a yet still further exemplary embodiment of the present invention, the cooling assembly for hydrogen electric trucks may further include at least a coupling member coupled to the third cross member, and the air tank may be coupled to the third cross member by the coupling members.

Other aspects and exemplary embodiments of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
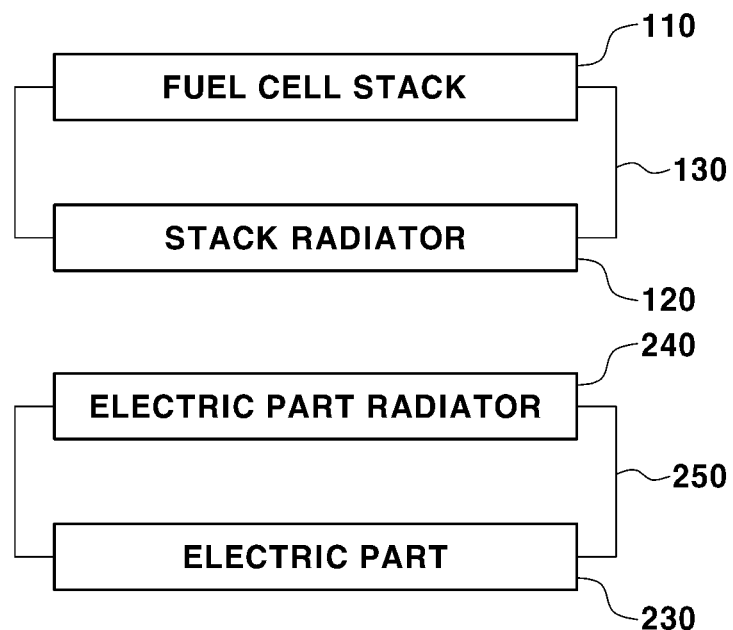
FIG. 1 is a block diagram of a cooling assembly for hydrogen electric trucks according to various exemplary embodiments of the present invention.

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the contrary, the present invention is intended to cover not only the exemplary embodiments of the present invention, but also various alternatives, modifications, equivalents and other embodiments, which may be included within the spirit and scope of the present invention as defined by the appended claims.

In the following description of the embodiments, it will be understood that the suffixes "unit", "member" and the like indicate units for processing at least one function or operation, and may be implemented using hardware or a combination of hardwares.

Furthermore, in the following description of the embodiments, spatially relative terms such as "upper", "lower" and the like are to be interpreted based on the height direction thereof, as illustrated in the figures.

Furthermore, in the following description of the embodiments, "the upper surface of a main bracket", "the lower surface of the main bracket" and "the height direction of the main bracket" are to be interpreted based on the height direction of the main bracket in the state in which the main bracket is mounted on the body of a hydrogen electric truck.

Moreover, in the following description of the embodiments, the term "independently" means that the surfaces of respective elements facing the external surface of the hydrogen electric truck are disposed separately, without overlapping between any regions of the surfaces.

Furthermore, in the following description of the embodiments, terms such as "first" and "second" are used only to distinguish one element from other elements, and these terms may not be construed as being limiting with regard to the sequence thereof.

FIG. 1 is a block diagram of a cooling assembly for hydrogen electric trucks according to various exemplary embodiments of the present invention.

Referring to FIG. 1, a cooling assembly 1000 for hydrogen electric trucks according to various exemplary embodiments of the present invention may include a stack cooling unit 100 configured to cool a fuel cell, and at least one electric part cooling unit 200 located on the side surface of a hydrogen electric truck. The surface of the stack cooling unit 100 facing the external surface of the hydrogen electric truck and the surface of the electric part cooling unit 200 facing the external surface of the hydrogen electric truck may be configured independently of each other. That is to say, the stack cooling unit 100 and the electric part cooling unit 200 may be independently located outside the hydrogen electric truck so that, when the electric part cooling unit 200 performs cooling, deterioration of cooling performance of the electric part cooling unit 200 due to a region thereof overlapping the stack cooling unit 100 may be prevented.

For example, the stack cooling unit 100 may be located on the front surface of the hydrogen electric truck and the electric part cooling unit 200 may be located on the side surface of the hydrogen electric truck, so that the surfaces of the stack cooling unit 100 and the electric part cooling unit 200 respectively facing the external surface of the hydrogen electric truck form a designated angle. Accordingly, regions of the stack cooling unit 100 and the electric part cooling unit 200, that overlap each other, may be removed.

The stack cooling unit 100 may be located at the front portion of the hydrogen electric truck, and may include a stack radiator 120 and a stack connection channel 130. The stack radiator 120 may be connected to a fuel cell stack 110 to cool the fuel cell stack 110. The stack connection channel 130 may be configured to connect the fuel cell stack 110 to the stack radiator 120 so that heat generated by the fuel cell stack 110 flows toward the stack radiator 120.

The electric part cooling unit 200 may include at least one main bracket 210 coupled to the side surface of the body of the hydrogen electric truck, at least one cross member mounted on the at least one main bracket 210, and an electric part radiator 240 fixed to the at least one main bracket 210 to cool an electric part 230 of the hydrogen electric truck.

The electric part radiator 240 is connected to the electric part 230, and the electric part cooling unit 200 may further include an electric part connection channel 250 configured to connect the electric part 230 to the electric part radiator 240 so that heat generated by the electric part 230 flows toward the electric part radiator 240.

Here, a heat exchange medium may be cooled air, cooling water, oil, or a CFC/HCFC-based refrigerant, and is not limited to a specific material in various exemplary embodiments of the present invention. For example, cooling water for the fuel cell stack 110 may be circulated in the stack connection channel 130 to cool the fuel cell stack 110 having a raised temperature.

In more detail, when the hydrogen electric truck is driven, the fuel cell stack 110 may generate driving force by converting energy obtained from the chemical reaction between hydrogen and oxygen into electrical energy. In the present process, thermal energy is generated due to the chemical reaction in the fuel cell stack 110, and the generated heat may be effectively removed through the stack connection channel 130. The cooling water for the fuel cell stack 110 may be transmitted from the fuel cell stack 110 to the stack radiator 120 via the stack connection channel 130, and may then be circulated again to the fuel cell stack 110 via the stack connection channel 130.

For example, cooling water for the electric part 230 may be circulated in the electric part connection channel 250 to cool the electric part 230 having a raised temperature. In more detail, when the hydrogen electric truck is driven by a motor, heat due to a phase change in current in an inverter and heat due to operation of the motor and a generator are generated, and the generated heat may be removed through the electric part connection channel 250. The cooling water for the electric part 230 may be transmitted from the electric part 230 to the electric part radiator 240 via the electric part connection channel 250, and may then be circulated again to the electric part 230 via the electric part connection channel 250.

Figure 2:
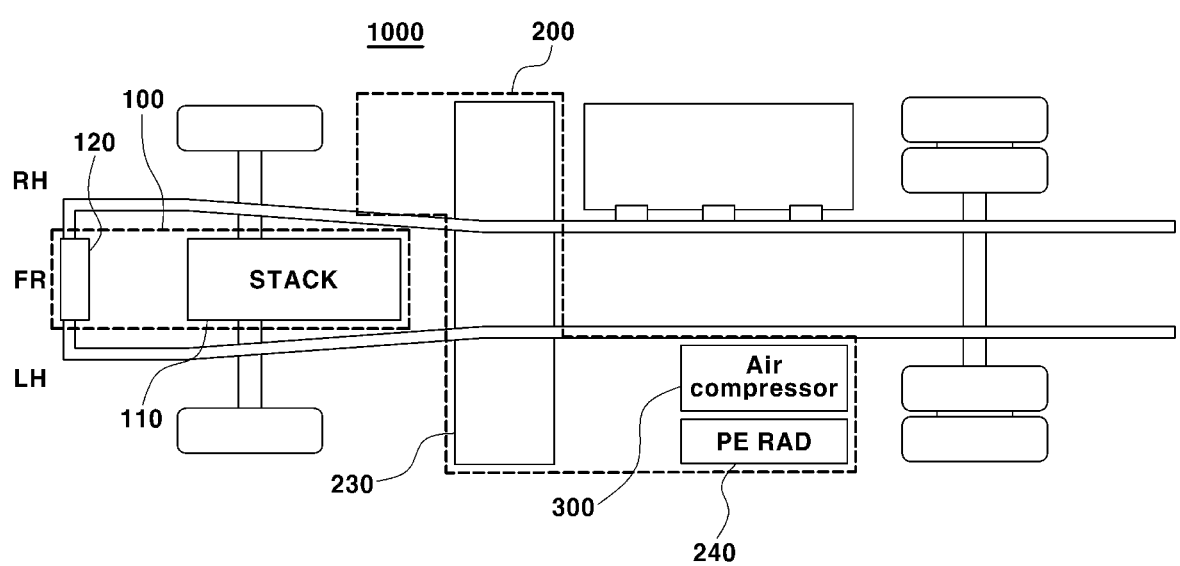
FIG. 2 is a cross-sectional view of a hydrogen electric truck to which the cooling assembly for hydrogen electric trucks according to various exemplary embodiments of the present invention is applied.

FIG. 2 is a cross-sectional view of a hydrogen electric truck to which the cooling assembly 1000 for hydrogen electric trucks according to various exemplary embodiments of the present invention is applied.

Referring to FIG. 2, the stack cooling unit 100 may be configured to be located at the front portion of the hydrogen electric truck, and at least one electric part cooling unit 200 may be configured to be located on the side surface of the hydrogen electric truck. The electric part cooling unit 200 may be fixedly coupled to a side frame 600 of the body of the hydrogen electric truck by bolting.

Because the electric part cooling unit 200 is disposed on the side surface of the hydrogen electric truck, shielding of a portion of the area of the stack radiator 120 by the electric part radiator 240 and shielding of the entirety of the heat dissipation area of the electric part radiator 240 may be prevented when both the stack cooling unit 100 and the electric part cooling unit 200 are mounted on the hydrogen electric truck, and thus, difficulty in realizing the optimal cooling efficiency of each of the stack radiator 120 and the electric part radiator 240 may be solved.

In various exemplary embodiments of the present invention, when the electric part cooling unit 200, which is conventionally located at the front portion of a hydrogen electric truck, is instead located on the side surface of the hydrogen electric truck, the heat dissipation area of the stack radiator 120 is increased, the temperature of the cooling water for the fuel cell stack 110 is lowered, and thus, the cooling performance of the stack radiator 120 may be improved. Furthermore, any portion of the area of the electric part radiator 240 of the electric part cooling unit 200 does not overlap the stack radiator 120, the temperature of the cooling water for the electric part 230 is lowered, and thus, the cooling performance of the electric part radiator 240 may be improved.

The electric part 230 may include at least one of a low-voltage DC-DC converter (LDC), a high-voltage DC-DC converter (HDC), a fuel-cell DC-DC converter (FDC), a high-voltage junction box for automotive vehicles, a motor control unit (MCU), an electric heat pump (EHP) or a motor.

In various exemplary embodiments of the present invention, when the hydrogen electric truck starts up or is driven at a low speed, only the electric part 230 may be operated so that the hydrogen electric truck is driven using only electricity, and only the electric part radiator 240 may be operated to cool the electric part 230.

In another exemplary embodiment of the present invention, when the hydrogen electric truck starts up or is driven at a low speed, both the fuel cell stack 110 and the electric part 230 may be operated so that the hydrogen electric truck is driven, the stack radiator 120 may be operated to cool the fuel cell stack 110, and the electric part radiator 240 may be operated to cool the electric part 230. Although both the stack radiator 120 and the electric part radiator 240 are operated, there are no areas of the stack radiator 120 and the electric part radiator that overlap each other and thus cooling performance of each of the stack radiator 120 and the electric part radiator 240 may be improved.

Figure 3:
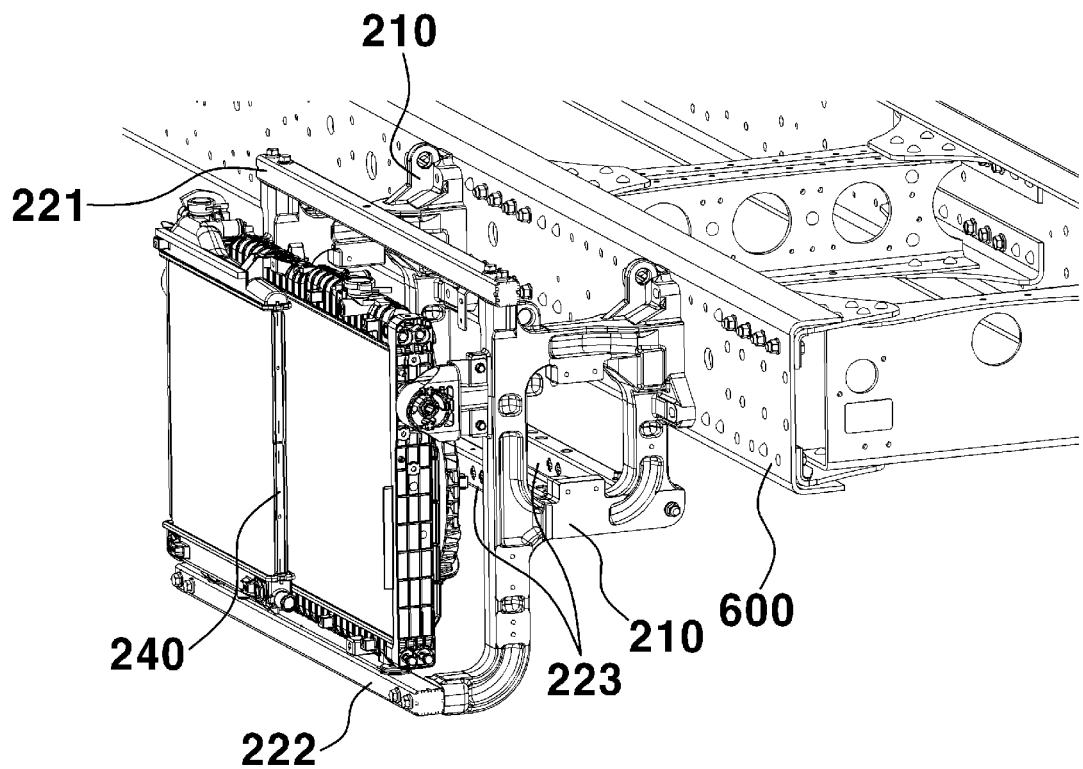
FIG. 3 is a view exemplarily illustrating the state in which an electric part cooling unit of the cooling assembly for hydrogen electric trucks according to various exemplary embodiments of the present invention is fixed to a side frame of the body of the hydrogen electric truck.

FIG. 3 is a view exemplarily illustrating the state in which the electric part cooling unit 200 of the cooling assembly 1000 according to various exemplary embodiments of the present invention is fixed to the side frame 600 of the body of the hydrogen electric truck.

Referring to FIG. 3, in various exemplary embodiments of the present invention, the electric part cooling unit 200 may be configured to be coupled to one of both side frames 600 of the body of the hydrogen electric truck by bolting. In another exemplary embodiment of the present invention, the electric part cooling unit 200 may be configured to be coupled to each of both side frames 600 of the body of the hydrogen electric truck by bolting. A side frame bolting structure may be formed at one end portion of each of a pair of main brackets 210, which are spaced from each other. The electric part cooling unit 200 may be coupled to the side frame 600 of the body of the hydrogen electric truck by four bolts provided at regions in which a pair of the main brackets 210 and the side frame 600 overlap each other.

Figure 4:
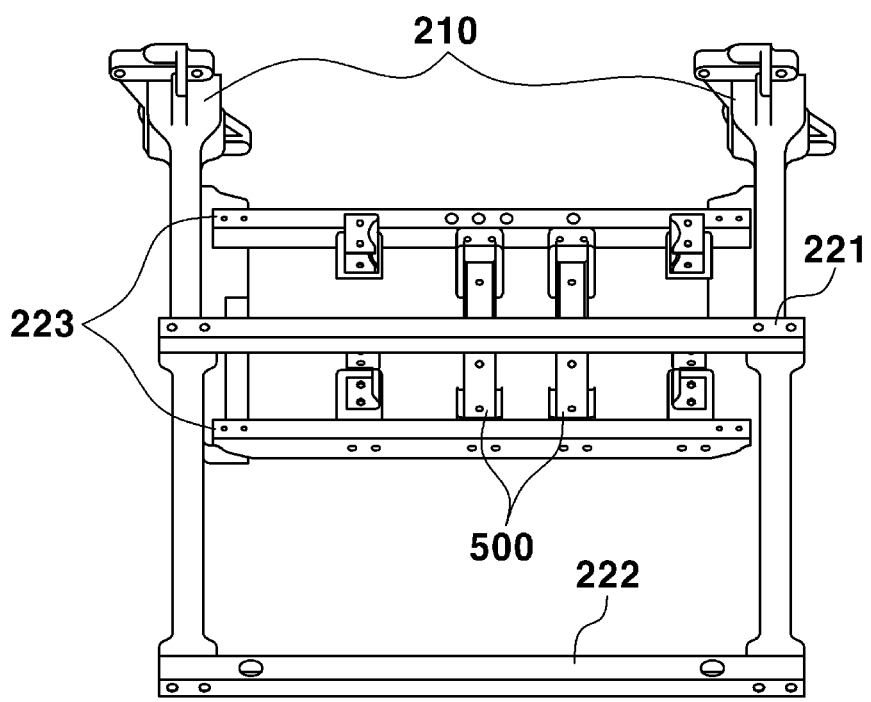
FIG. 4 is a view exemplarily illustrating a first cross member, a second cross member, third cross members, and fasteners configured to fasten an air compressor and air tanks to the third cross members of the cooling assembly for hydrogen electric trucks according to various exemplary embodiments of the present invention.
Figure 5:
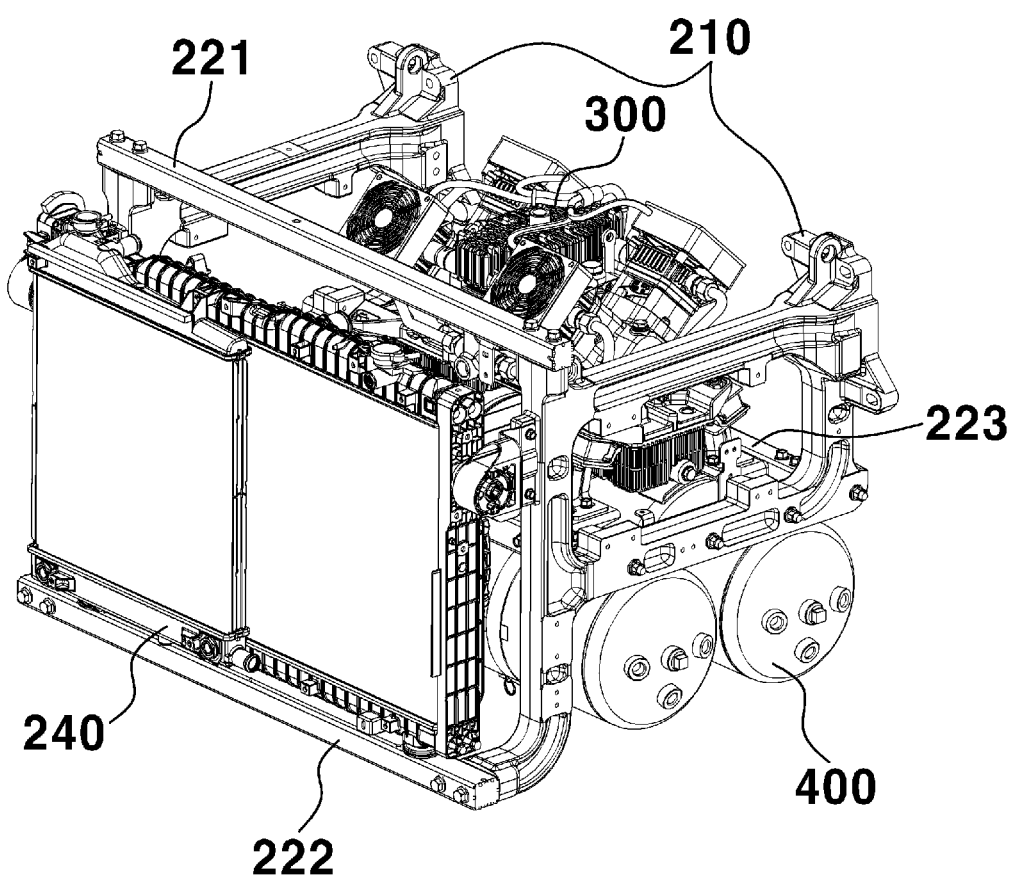
FIG. 5 is a view exemplarily illustrating the state in which the air compressor and the air tanks are mounted on the electric part cooling unit of the cooling assembly for hydrogen electric trucks according to various exemplary embodiments of the present invention.

FIG. 4 is a view exemplarily illustrating a first cross member, a second cross member, third cross members, and fasteners configured to fasten an air compressor and air tanks to the third cross members of the cooling assembly for hydrogen electric trucks according to various exemplary embodiments of the present invention. FIG. 5 is a view exemplarily illustrating the state in which the air compressor and the air tanks are mounted on the electric part cooling unit 200 of the cooling assembly for hydrogen electric trucks according to various exemplary embodiments of the present invention.

In the cooling assembly 1000 for hydrogen electric trucks according to various exemplary embodiments of the present invention, at least one cross member having a length corresponding to the distance between the two main brackets 210 may be provided between the two main brackets 210 to connect the main brackets 210. The at least one cross member may be configured to maintain the support rigidity of the hydrogen electric truck in the forward and rearward directions.

The at least one cross member may include a first cross member 221 located on the upper surfaces of the main brackets 210. Furthermore, the at least one cross member may include a second cross member 222 located on the lower surfaces of the main brackets 210. Furthermore, the at least one cross member may include at least one third cross member 223 located between the first cross member 221 and the second cross member 222 in the height direction of the main brackets 210.

In various exemplary embodiments of the present invention, one first cross member 221 may be coupled to the upper surfaces of the upper end portions of a pair of main brackets 210, and one second cross member 222 may be coupled to the lower surfaces of the main brackets 210, which protrude in the width direction thereof. The electric part radiator 240 may be configured to be located on the external end portions of the main brackets 210 to be coupled to the second cross member 222.

A cooling assembly 1000 for hydrogen electric trucks according to various exemplary embodiments of the present invention may be configured such that an air compressor 300 and at least one air tank 400 are selectively coupled thereto. The cooling assembly 1000 for hydrogen electric trucks may further include the air compressor 300 coupled to the third cross member 223 and configured to generate compressed air, and the air tank 400 disposed below the air compressor 300, coupled to the third cross member 223, and configured to store the compressed air generated by the air compressor 300.

At least one third cross member 223 may be provided between the first cross member 221 and the second cross member 222 in the height direction of the main bracket 210. In various exemplary embodiments of the present invention, two air tanks 400 may be coupled to two third cross members 223 which are spaced from each other in parallel.

The air compressor 300 and the air tanks 400 may be configured to provide compressed air to a heating, ventilation and air-conditioning system or a brake system of a hydrogen electric truck. In various exemplary embodiments of the present invention, the air compressor 300 may compress air into a high-temperature and high-pressure state and then provide the compressed air to the brake system, and may be connected to the air tanks 400 so that the compressed air generated by the air compressor 300 may be supplied to the air tanks 400 by hydraulic lines.

The length of the main brackets 210 in the width direction may be adjusted so that the main brackets 210 are applicable to various types of vehicles. An internal space may be formed in a response to the distance between a pair of the main brackets 210 and the length of the main brackets 210 in the width direction thereof, so that the air compressor 300 and the air tanks 400 are mounted therein. When it is not required to mount an air compressor 300 or air tanks 400 in the present internal space, the length of a pair of the main brackets 210 in the width direction may be decreased so that the main brackets 210 are applicable not only to trucks but also to other kinds of vehicles based thereon.

The air compressor 300 and the air tanks 400 may be configured to be detachably coupled to the third cross members 223. In various exemplary embodiments of the present invention, when the electric part cooling unit 200 is used in the state in which the air compressor 300 and the air tanks 400 are mounted on the third cross members 223 and then the air compressor 300 and the air tanks 400 become unnecessary, the air compressor 300 and the air tanks 400 may be separated from the third cross members 223. On the other hand, when the electric part cooling unit 200 is used in the state in which the air compressor 300 and the air tanks 400 are not mounted on the third cross members 223 and then the air compressor 300 and the air tanks 400 become necessary, the air compressor 300 and the air tanks 400 may be coupled to the third cross members 223.

According to various exemplary embodiments of the present invention, the cooling assembly 1000 for hydrogen electric trucks may further include coupling members 500 coupled to the third cross member 223, and the air tank 400 may be coupled to the third cross member 223 by the coupling members. The coupling members 500 for coupling the air tank 400 may be provided between a pair of the third cross members 223, which are spaced from each other, in the width direction of the main brackets 210. The coupling members 500 may be coupled to the third cross members 223 by bolting. In another exemplary embodiment of the present invention, the coupling members 500 may extend perpendicular to the width direction of the main brackets 210.

Brackets for mounting the air compressor 300 thereon may be provided between a pair of the third cross members 223 which are spaced from each other. Four brackets are provided between a pair of the third cross members 223 to fix the air compressor 300.

In brief, various aspects of the present invention are directed to providing the cooling assembly 100 for hydrogen electric trucks enables the stack cooling unit 100 and the electric part cooling unit 200 to be disposed separately to improve the cooling performance of each of the stack cooling unit 100 and the electric part cooling unit 200, and employs the cross members 220 configured to increase rigidity in the forward and rearward directions to improve the rigidity of the body of a hydrogen electric truck.

As is apparent from the above description, a cooling assembly for hydrogen electric trucks according to various exemplary embodiments of the present invention are directed to providing the following effects through the above-described configuration and connection and usage relations.

The cooling assembly for hydrogen electric trucks according to various exemplary embodiments of the present invention enables a stack cooling unit and an electric part cooling unit to be disposed separately on a hydrogen electric truck so that there are no areas of a stack radiator and an electric part radiator, which overlap each other, and may thus improve cooling performance of each of the stack radiator and the electric part radiator.

Furthermore, the cooling assembly for hydrogen electric trucks according to various exemplary embodiments of the present invention employs cross members configured to increase rigidity in the forward and rearward directions, and may thus improve the rigidity of the body of the hydrogen electric truck and secure an additional space for mounting an air compressor and an air tank therein.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling assembly for a hydrogen electric vehicle, the cooling assembly comprising:
    a stack cooling unit configured to cool a fuel cell in the hydrogen electric vehicle; and
    at least one electric part cooling unit located on a side surface of the hydrogen electric vehicle,
    wherein a surface of the stack cooling unit to face an external surface of the hydrogen electric vehicle and a surface of the at least one electric part cooling unit to face the external surface of the hydrogen electric vehicle are configured independently of each other,
    wherein each of the at least one electric part cooling unit includes:
        at least one main bracket coupled to a side surface of a body of the hydrogen electric vehicle; and
        at least one cross member mounted on the at least one main bracket; and
    wherein the at least one cross member includes a first cross member located on an upper surface of the at least one main bracket,
    wherein the at least one cross member further includes a second cross member located on a lower surface of the at least one main bracket, and
    wherein the at least one cross member further includes at least a third cross member located between the first cross member and the second cross member in a height direction of the at least one main bracket.

2. The cooling assembly of claim 1, wherein each of the at least one electric part cooling unit further includes:
    an electric part radiator fixed to the at least one main bracket to cool an electric part of the hydrogen electric vehicle.

3. The cooling assembly of claim 2,
    wherein the electric part radiator is located on an external end portion of the at least one main bracket and is coupled to the second cross member.

4. The cooling assembly of claim 1,
    wherein the stack cooling unit is located at a front portion of the hydrogen electric vehicle.

5. The cooling assembly of claim 4,
    wherein the stack cooling unit includes a stack radiator connected to a fuel cell stack to cool the fuel cell stack, and a stack connection channel to connect the fuel cell stack to the stack radiator so that heat generated by the fuel cell stack flows toward the stack radiator.

6. The cooling assembly of claim 2,
    wherein the electric part radiator is connected to the electric part; and
    wherein each of the at least one electric part cooling unit further includes an electric part connection channel connecting the electric part to the electric part radiator so that heat generated by the electric part flows toward the electric part radiator.

7. The cooling assembly of claim 2,
    wherein the electric part includes at least one of a low-voltage DC-DC converter (LDC), a high-voltage DC-DC converter (HDC), a fuel-cell DC-DC converter (FDC), a high-voltage junction box for automotive vehicles, a motor control unit (MCU), an electric heat pump (EHP) or a motor.

8. The cooling assembly of claim 1, wherein the at least one electric part cooling unit is coupled to one of first and second side frames of the body of the hydrogen electric vehicle by bolting.

9. The cooling assembly of claim 1, wherein the at least one electric part cooling unit is coupled to each of first and second side frames of the body of the hydrogen electric vehicle by bolting.

10. The cooling assembly of claim 1, further including:
an air compressor coupled to the at least a third cross member to generate compressed air; and
an air tank disposed below the air compressor, coupled to the at least a third cross member, and configured to store the compressed air generated by the air compressor.

11. The cooling assembly of claim 10, wherein the air compressor is detachably coupled to the at least a third cross member.

12. The cooling assembly of claim 10, wherein the air tank is detachably coupled to the at least a third cross member.

13. The cooling assembly of claim 12, further including:
at least a coupling member coupled to the at least a third cross member,
wherein the air tank is detachably coupled to the at least a third cross member by the at least a coupling member.

* * * * *